United States Patent [19]
Santoiemmo

[11] Patent Number: 5,465,530
[45] Date of Patent: Nov. 14, 1995

[54] METHOD OF USING A PAPER PACKING PRODUCT TO STORE/SHIP PLANTS WITH EXPOSED ROOTS

[75] Inventor: Carl V. Santoiemmo, Highland Heights, Ohio

[73] Assignee: Ranpak Corp., Concord, Ohio

[21] Appl. No.: 147,379

[22] Filed: Nov. 3, 1993

[51] Int. Cl.$^6$ .................................................. A01G 9/02
[52] U.S. Cl. ...................... 47/84; 47/66; 47/58; 206/423
[58] Field of Search .................................. 47/84, 58, 59, 47/66, 84 C; 206/423, 584

[56] References Cited

U.S. PATENT DOCUMENTS

| | | | |
|---|---|---|---|
| 4,918,861 | 4/1990 | Carpenter et al. | 47/59 |
| 5,088,972 | 2/1992 | Parker | 493/352 |
| 5,134,013 | 7/1992 | Parker | 428/182 |
| 5,173,352 | 12/1992 | Parker | 428/174 |

FOREIGN PATENT DOCUMENTS 7809211  3/1979  Netherlands ........................... 47/59

*Primary Examiner*—Gary Benzion
*Attorney, Agent, or Firm*—Renner, Otto, Boisselle & Sklar

[57] ABSTRACT

A method of using a paper packing product (10) to store/ship a plant (12) with exposed roots (14). The method comprises the steps of: providing a multitude of narrow, elongated strips of paper material; wetting the paper strips; and packing the paper strips around the exposed roots (14) of a plant (12). In this manner, a root-packed plant is created which comprises a plant with unsoiled roots and a paper packing product packed around the unsoiled roots. Preferably, the paper strips include a plurality of transverse folds against the natural resilience of the material to form a longitudinally compressed strip and these strips are intertwined and interconnected to form a resilient mass. The preferred paper material is untreated thirty pound kraft paper and the strips are approximately ⅛ inch wide and approximately four to six inches long in an unfolded state.

11 Claims, 3 Drawing Sheets

METHOD OF USING A PAPER PACKING PRODUCT TO STORE/SHIP PLANTS WITH EXPOSED ROOTS

FIELD OF THE INVENTION

This invention relates generally as indicated to a method of using a paper packing product to store/ship a plant with exposed roots. More particularly, the present invention relates to a paper packing product which is believed to more adequately meet the needs of woody ornamental propagators as compared to the traditionally employed Sphagnum Moss and/or Shingletow root-packing products.

BACKGROUND OF THE INVENTION

In the nursery industry, one major category of vegetation includes woody ornamental plants, such as fruit trees, dogwood trees, willow trees, etc. In a typical nursery distribution chain for woody ornamental plants, the initial link is a "propagator" or "grower of seeds." The propagator will plant the seeds in soil trays and cultivate the seedlings growing therefrom until they reach a sufficient maturity for storage/shipping.

Once the seedlings reach a sufficient maturity, they are removed from the trays. Sometimes, the soil which clings to the roots of the seedlings is left thereon during shipping/storage. Often, however, the soil is completely removed from the roots so that the propagator can conserve soil for future plantings. Thus, the seedlings' unsoiled roots are "bare" or "exposed" and, prior to shipment/storage, they must be wrapped, or packed, with a suitable packing product.

Once the exposed roots of the plants are packed, they may be immediately shipped to another location (i.e., a wholesale grower, a plant retailer, or a mail order consumer). This shipment usually entails compiling a plurality of the root-packed plants in a box, and then shipping the box to the desired location. At the desired location, the seedlings will be replanted, either by being inserted directly in the ground or by being potted, depending on the circumstances. With particular reference to plant retailers, they may place the packed unsoiled roots of a seedling in a bag for short term consumer transporting purposes.

Alternatively, the root-packed plants may be temporarily stored (two to four months) in a dormant environment in preparation for the next suitable planting season. During this temporary storage (sometimes called "cold storage") the root-packed plants are stacked on pallets and maintained at an approximately 40° F. temperature. Also, some sort of sprinkling system will usually be provided to periodically "re-wet" the root-packed plants. At the termination of the storage period, the root-packed plants are shipped to another location in substantially the same manner as discussed in the preceding paragraph.

In the past, "Sphagnum Moss" and "Shingletow" have been the primary packing products used by propagators to ship/store plants with exposed roots. These products seem to have acceptable moisture capacities for plant-dormancy purposes. (Specifically, as explained in more detail below, Sphagnum Moss has a 533% moisture capacity and Shingletow has a 419% moisture capacity.) Additionally, these prior art packing products appear to have satisfactory re-wetting intervals (Sphagnum Moss has a three to four day re-wetting interval and Shingletow has a two to three day re-wetting interval). A further advantage of the Sphagnum Moss and Shingletow packing products is that they do not exhibit any mold-induced or other breakdowns under cold storage conditions.

Nevertheless, the use of Sphagnum Moss and/or Shingletow for root-packing purposes is not without drawbacks. For example, Sphagnum Moss is a harvested plant and thus its price/availability is subject to seasonal climate fluctuations. Additionally, as with any harvested commodity (and also because of the wide range of Sphagnum Moss species in existence), this product's quality tends to vary widely and consistency is difficult to obtain. Regarding Shingletow, it is a byproduct of a shingle manufacturing process whereby its cost, accessibility, and/or quality is at the mercy of the completely unrelated roofing industry.

Moreover, the moisture capacities of Sphagnum Moss and Shingletow, while suitable for plant dormancy purposes, are believed to be excessive for shipping and storage situations. As was indicated above, Sphagnum Moss has a 533% moisture capacity and Shingletow has a 419% moisture capacity. (In the context of the present application, the "moisture capacity" of a particular product corresponds to the percentage increase in the weight of the wetted product as compared to the weight of the dry product.) Thus, "wetted" Sphagnum Moss holds 5.33 times its dry weight and "wetted" Shingletow holds 4.19 times its dry weight. These excessive moisture capacities result in a substantial amount of unnecessary "water weight" in the wetted packing product which translates into increased shipping costs when the root-packed plants are transported and/or which translates into elevated water/labor bills when the root-packed plants are placed in cold storage.

Accordingly, applicant believes that a need remains for a packing product which more adequately meets the needs of woody ornamental propagators. Specifically, a need remains for a root-packing product which is not affected by seasonal climate fluctuations, which is not at the mercy of an unrelated industry, and which may be produced with consistent quality. Additionally or alternatively, applicant believes a need remains for a packing product having a moisture capacity which is sufficient to satisfy plant dormancy requirements but which is not so "excessive" that it results in a substantial amount of unnecessary "water weight" in the wetted packing product.

SUMMARY OF THE INVENTION

The present invention provides a method of using a paper packing product to store/ship a plant with exposed roots. As with the above-discussed Sphagnum Moss and Shingletow root-packing products, applicant's preferred paper packing product has an acceptable moisture capacity for plant-dormancy purposes (215%), has a satisfactory re-wetting interval (3–4 days), and does not exhibit any mold-induced or other breakdowns in cold storage conditions. However, in contrast to the prior art root-packing products discussed above, applicant's paper product is not affected by seasonal climate fluctuations and/or the demand of unrelated industries, and it may be produced with consistent quality. Moreover, applicant's testing revealed that the preferred paper packing product holds "just enough" water to satisfy plant dormancy requirements. In this manner, there is very little unnecessary "water weight" in the wetted packing product thereby resulting in decreased shipping costs when the root-packed plants are transported and/or thereby resulting in lower water/labor bills when the root-packed plants are placed in cold storage.

More particularly, the present invention provides a method of using a paper packing product to store/ship a plant with exposed roots. The method comprises the steps of providing a multitude of narrow, elongated strips of paper material; wetting the paper strips; and packing the paper strips (preferably after they are wetted) around the exposed roots of a plant. In this manner, a root-packed plant is created comprising a plant with unsoiled roots and a paper packing product which is packed around the unsoiled roots.

In the preferred paper packing product, each of the strips includes a plurality of transverse folds against the natural resilience of the material to form a longitudinally compressed strip. In other words, it is folded in an accordion-like fashion. In the completed packing product, the strips are intertwined and interconnected to form a resilient mass. The paper material is untreated thirty pound kraft paper and the strips are approximately ⅛ inch wide and approximately four to six inches long in an "unfolded" state.

The method according to the present invention may further comprise the steps of: packing the wetted paper strips around the exposed roots of a plurality of plants; compiling the plurality of root-packed plants into a box; and shipping the box to a desired location for replanting. Additionally or alternatively, the method may comprise the steps of maintaining the root-packed plants at an approximately 40° F. temperature; and periodically re-wetting the root-packed plants. The maintaining step would preferably include the step of stacking the root-packed plants on pallets and the re-wetting step would preferably be performed every three to four days by a sprinkling system.

These and other features of the invention are fully described and particularly pointed out in the claims. The following descriptive annexed drawings set forth in detail one illustrative embodiment. However, this embodiment is indicative of but one of the various ways in which the principles of the invention may be employed.

DETAILED DESCRIPTION

Figure 1:
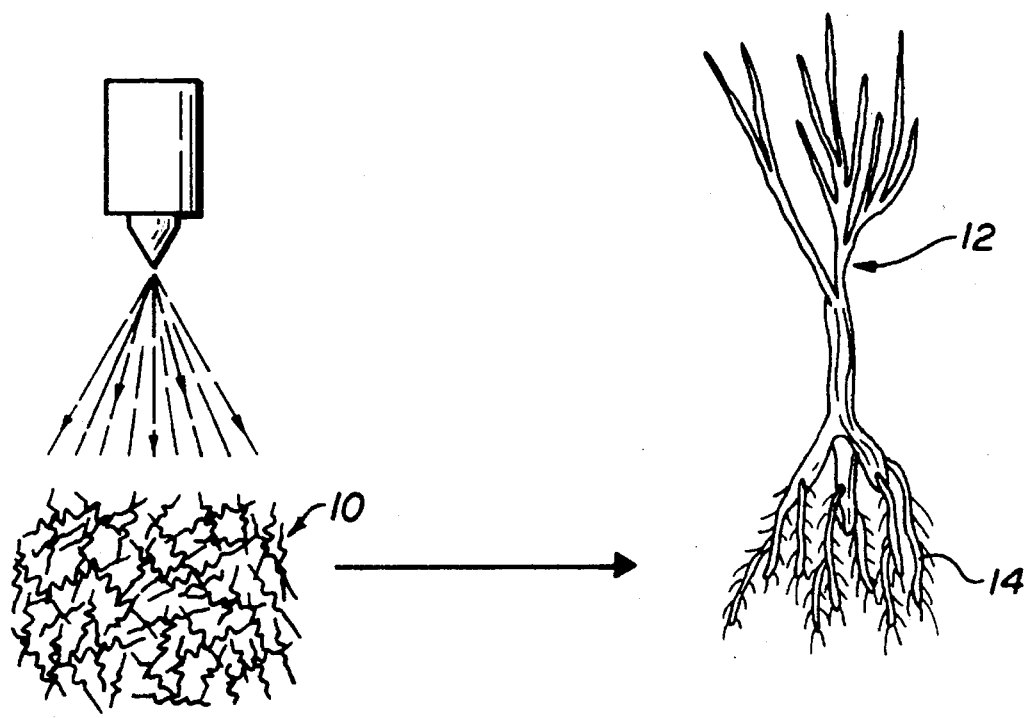
FIG. 1 is schematic view of an initial step of a method according to the present invention, namely the step of wetting a paper packing product so that it can be used to store and/or ship a plant with exposed roots.
Figure 2:
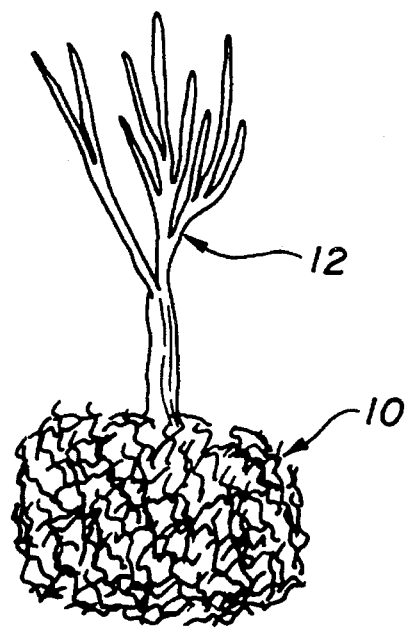
FIG. 2 is a schematic view of the next step of the method, specifically the step of packing the wetted paper packing product around the exposed roots of the plant.

Referring now to the drawings in detail and initially to FIGS. 1 and 2, the method according to the present invention is schematically illustrated. The method includes the step of wetting a paper packing product 10 so that it can be used to store/ship a plant 12 with exposed roots 14 (see FIG. 1) and then packing the wetted paper packing product 10 around the exposed roots 14 of the plant 12 (see FIG. 2). In this manner, a root-packed plant is created comprising a plant 12 with unsoiled roots 14 and a paper packing product 10 which is packed around the unsoiled roots 14. As is explained in more detail below, the use of the paper packing product 10 in this manner is believed to provide a method which more adequately meets the needs of woody ornamental propagators than the prior art root-packing products.

The preferred paper packing product 10 is disclosed in U.S. Pat. Nos. 5,088,972; 5,134,013; and 5,173,352. (These patents are assigned to the assignee of the present application and their entire disclosures are hereby incorporated by reference.) Particularly, the product 10 comprises a multitude of narrow, elongated strips of paper material. Each of the strips includes a plurality of transverse folds against the natural resilience of the material to form a longitudinally compressed strip. In other words, it is folded in an accordion-like fashion. In the completed packing product 10, such as shown in FIG. 1, the strips are intertwined and interconnected to form a resilient mass. Preferably, the paper material is untreated thirty pound kraft paper and the strips are approximately ⅛ inch wide and approximately four to six inches long in an "unfolded" state.

The preferred paper packing product 10 may be made by the machines/methods disclosed in the above-identified patents and also by the machines/methods disclosed in pending U.S. application Ser. Nos. 07/971,046 and 07/861,225. (These applications are also assigned to the assignee of the present application. In such machines/methods, one or more layers of paper are cut in a longitudinal direction to form a plurality of strips. These longitudinally cut strips are then partially jammed within a confined area and each strip is thereby folded into the desired accordion shape.

Applicant's testing has shown that the preferred paper packing product 10 has an acceptable moisture capacity for plant-dormancy purposes (215%), has a satisfactory re-wetting interval (3–4 days), and does not exhibit any mold-induced or other breakdowns in cold storage conditions. Additionally, as is hopefully apparent, applicant's paper product 10 is not affected by seasonal climate fluctuations and/or the demand of unrelated industries, and for this and other reasons, it may be produced with consistent quality. Moreover, applicant's testing further revealed that the preferred paper packing product 10 holds "just enough" water to satisfy plant dormancy requirements. In this manner, there is very little unnecessary "water weight" in the wetted packing product thereby resulting in decreased shipping costs when the root-packed plants are transported and/or thereby resulting in lower water/labor bills when the root-packed plants are placed in cold storage.

The preferred and illustrated plant 12 is a woody ornamental seedling, such as fruit tree, a dogwood tree, or a willow tree. In a typical nursery distribution chain, the propagator will plant the woody ornamental seeds in soil trays (not shown) and cultivate the seedlings growing therefrom until they reach a sufficient maturity for storage/shipping. Once the plant 12 reaches a sufficient maturity, it is removed from the trays and the soil is completely removed from its roots 14 so that the propagator can conserve soil for future plantings (see FIG. 1).

Figure 3:
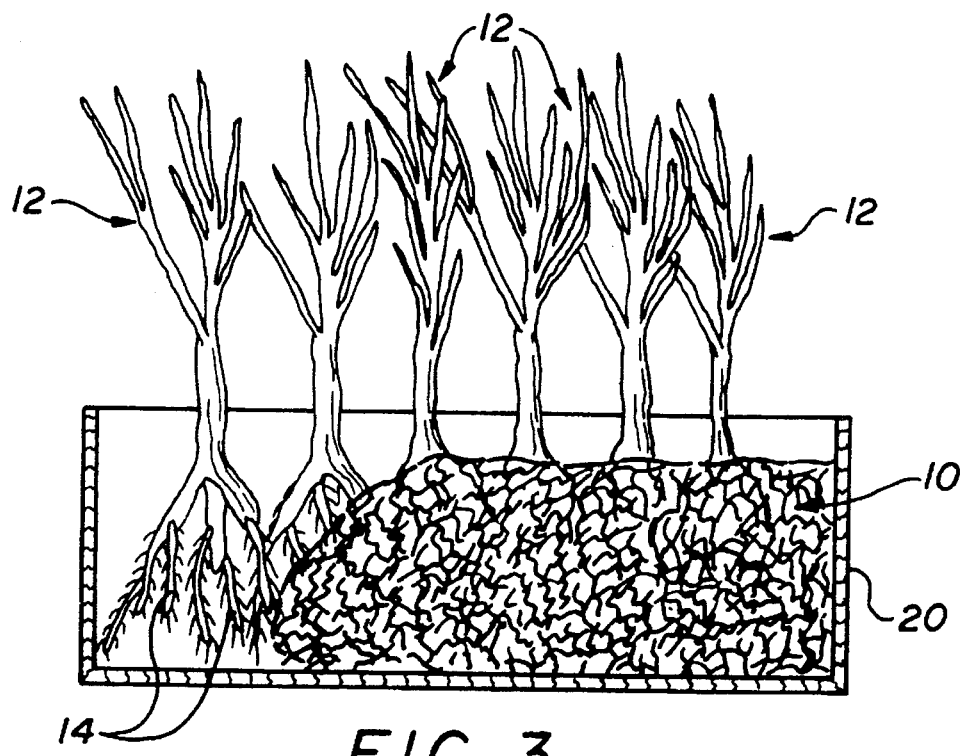
FIG. 3 is a schematic view of a shipping step of the method, specifically the step of placing a plurality of root-packed plants in a box for shipping, this step being performed when the root-packed plants will be transported to another location for replanting.
Figure 4:
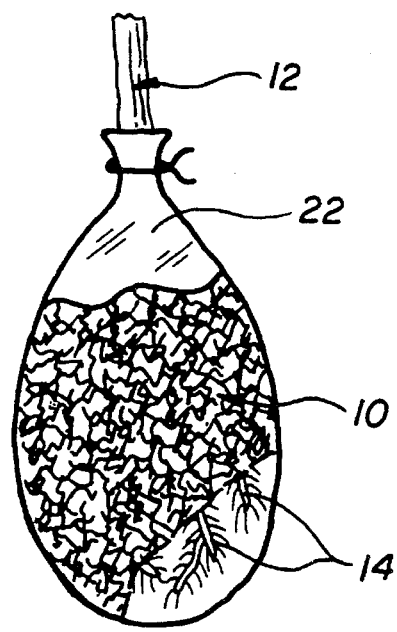
FIG. 4 is a schematic view of an optional step of the method, specifically the step of placing the packed roots of the plant in a bag for short term consumer transporting purposes, this step being performed after the root-packed plant reaches a retailer via the shipping step shown schematically in FIG. 3.
Figure 5:
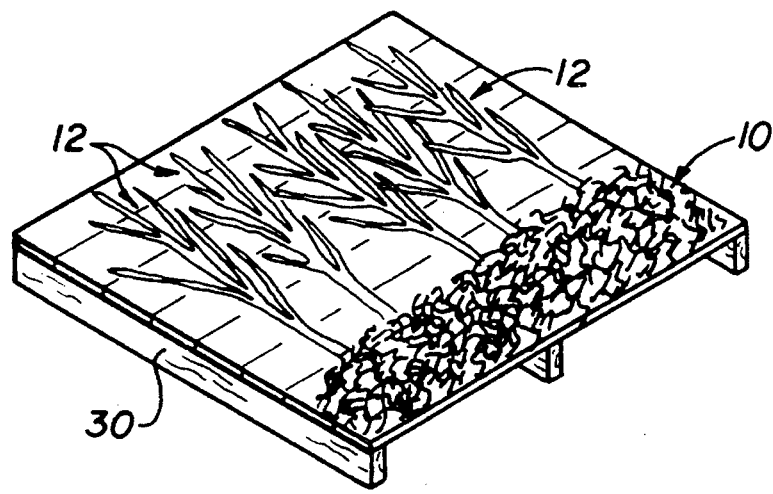
FIG. 5 is a schematic view of a storing step of the method, namely the step of placing a plurality of the root-packed plants on pallets for cold storage, this step being performed when the root-packed plant will be temporarily stored before being subsequently shipped to another location for replanting.
Figure 6:
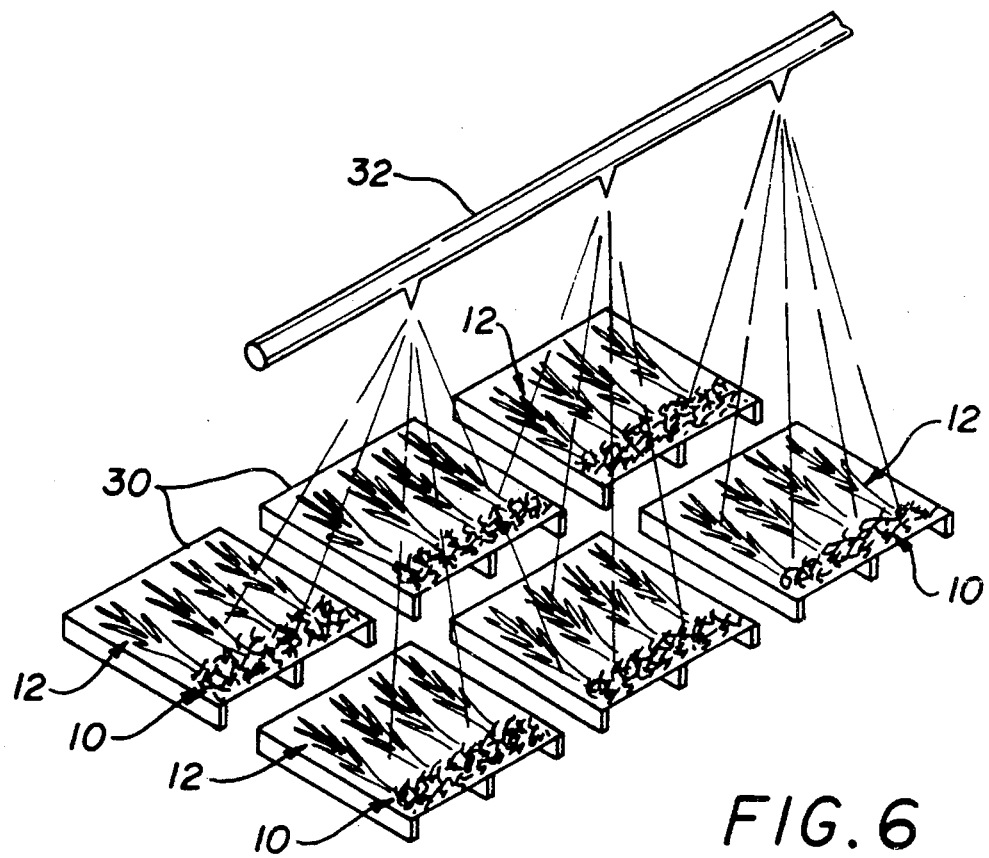
FIG. 6 is a schematic view of a re-wetting step performed when the seedlings are temporarily stored.

Once the unsoiled roots 14 of the plant 12 are packed with the paper packing product 10 (see FIG. 2), they may be immediately shipped to another location (i.e., a wholesale grower, a plant retailer, or a mail order consumer). This shipment usually entails compiling a plurality of the root-packed plants 12 in a box 20, and then shipping the box 20 to the desired location. (See FIG. 3.) At the desired location, the seedlings 12 will be replanted, either by being inserted directly in the ground or by being potted, depending on the circumstances. With particular reference to plant retailers, they may place the packed roots 14 of a seedling 12 in a bag 22 for short term consumer transporting purposes. (See FIG. 4.)

Alternatively, the root-packed plants 12 may be temporarily stored (two to four months) in a dormant environment in preparation for the next suitable planting season. During this temporary storage (sometimes called "cold storage") the root-packed plants 12 are stacked on pallets 30 and maintained at an approximately 40° F. temperature. Also, some sort of sprinkling system 32 will usually be provided to periodically "re-wet" the root-packed plants 12. If the preferred paper packing product 10 is used, applicant estimates that this re-wetting would occur every 3–4 days. At the termination of the storage period, the root-packed plants 12 may be shipped to another location in substantially the same manner as discussed in the preceding paragraph.

Although the invention has been shown and described with respect to a certain preferred embodiment, it is obvious that equivalent alterations and modifications will occur to others skilled in the art upon the reading and understanding of this specification. For example, while the preferred paper strips include transverse folds, other types of crimped strips are possible with, and contemplated by, the present invention. In fact, "unfolded" or "uncrimped" paper strips may perform acceptably as a root-packing product in some situations. Also, the paper types and/or the dimensions of the packing product may be altered if necessary or desired. Additionally, although the preferred packing product is untreated, certain treatments may be developed which would be appropriate for such an application. The present invention includes all such equivalent alterations and modifications and is limited only by the scope of the following claims.

What is claimed is:

1. A method of packing exposed roots of a plant, said method comprising the steps of:

providing a multitude of interwined, narrow, elongated, longitudinally compressed strips of paper material, said paper strips including a plurality of transverse folds against the natural resilience of the material to form said longitudinally compressed strips;

wetting the paper strips;

packing the paper strips around the exposed roots of said plant.

2. A method as set forth in claim 1 wherein said wetting step is performed prior to said packing step.

3. A method as set forth in claim 1 wherein the strips are interconnected to form a resilient mass.

4. A method as set forth in claim 3 wherein the strips are approximately ⅛ inch wide and approximately four to six inches long in an unfolded state.

5. A method as set forth in claim 1 wherein said providing step includes the steps of:

cutting one or more layers of paper to form a plurality of stripes; and partially jamming the strips within a confined area to thereby fold each strip in an accordion-like fashion.

6. A method as set forth in any of claims 1–5 wherein the paper material is untreated thirty pound kraft paper.

7. A method as set forth in claim 1 further comprising the steps of:

packing the wetted paper strips around the exposed roots of a plurality of plants;

compiling the plurality of root-packed plants into a box; and shipping the box to a desired location for replanting.

8. A method as set forth in claim 1 further comprising the steps of:

maintaining the root-packed plant at an approximately 40° F. temperature; and periodically re-wetting the root-packed plant.

9. A method as set forth in claim 8 wherein said maintaining step includes the step of stacking the root-packed plants on pallets.

10. A method as set forth in claim 9 wherein said re-wetting step is performed every three or four days.

11. A method as set forth in claim 9 wherein said re-wetting step is performed by a sprinkling system.

* * * * *